(No Model.)
J. WALSH, Jr.
STOP VALVE.
No. 574,838.   Patented Jan. 5, 1897.
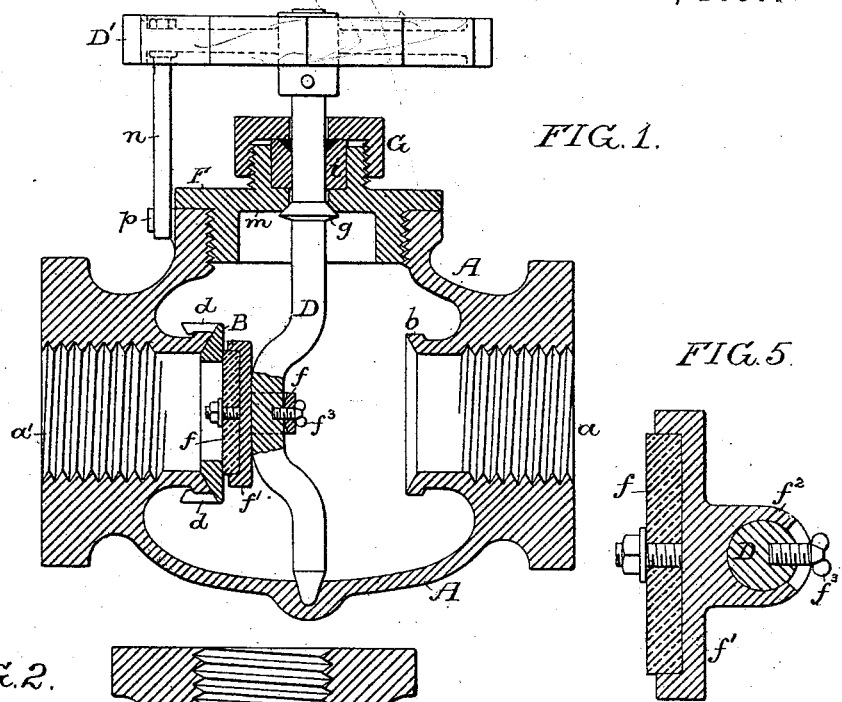
FIG. 1.
FIG. 5.
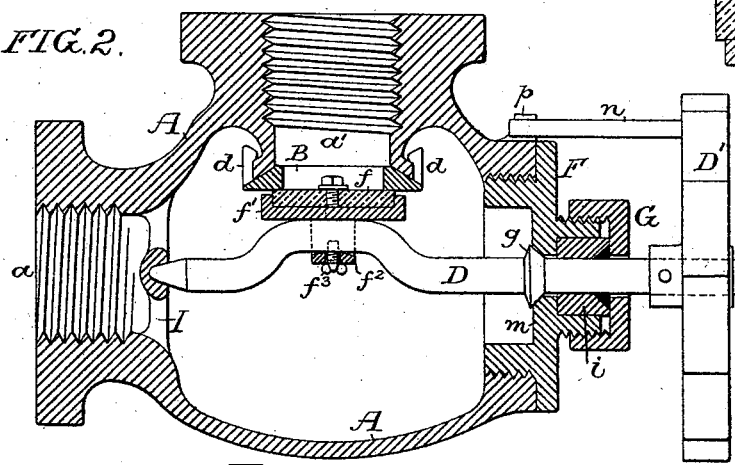
FIG. 2.
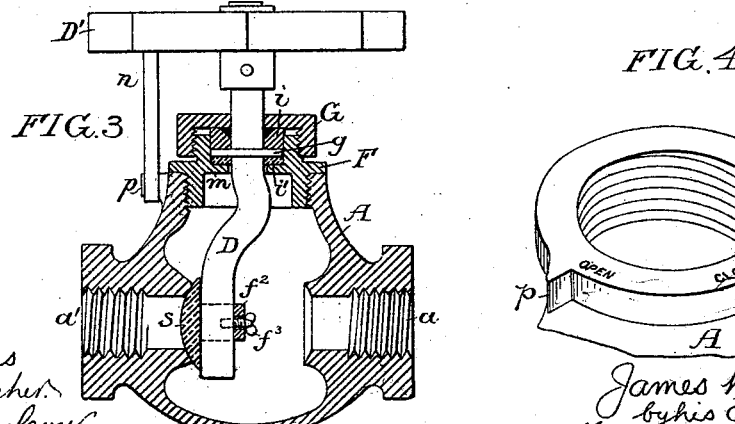
FIG. 3.   FIG. 4.
Witnesses
R. Schleicher
Chas. Derbou
Inventor
James Walsh Jr.
by his Attorneys
Howson & Howson

UNITED STATES PATENT OFFICE.

JAMES WALSH, JR., OF PHILADELPHIA, PENNSYLVANIA.

STOP-VALVE.

SPECIFICATION forming part of Letters Patent No. 574,838, dated January 5, 1897.

Application filed January 7, 1896. Serial No. 574,632. (No model.)

*To all whom it may concern:*

Be it known that I, JAMES WALSH, Jr., a citizen of the United States, residing in Philadelphia, Pennsylvania, have invented certain Improvements in Stop-Valves, of which the following is a specification.

My invention consists of a valve of the character set forth in my Patent No. 524,922, dated August 21, 1894, the purpose of my present invention being to simplify the construction of the valve, to provide the same with a detachable seat, and to furnish a simple and effective stop which limits the movement of the valve-stem and serves also as an indicator to show whether the valve is open or closed.

In the accompanying drawings, Figure 1 is a longitudinal section of a valve constructed in accordance with my present invention. Fig. 2 is a similar view showing another form of valve. Fig. 3 is a view illustrating the application of my invention to a valve having a special form of bearing for the valve-stem. Fig. 4 is a perspective view of part of the valve-casing, showing the stops thereon; and Fig. 5 is a sectional plan view of the valve-disk and its stem, illustrating the means employed for mounting the valve-disk on the stem.

A represents the valve-casing, which has an inlet branch $a$ and an outlet branch $a'$, both the inlet and outlet branches having at the inner ends, and within the central chamber of the valve, an annular flange $b$, surrounding the branch. Each of these flanges forms a shoulder for engagement with spring arms or fingers $d$, projecting from a detachable annular valve-seat B, the outer face of the latter being ground for adaptation to a ground seat formed at the inner end of the branch $a$ or $a'$, so that when the seat is held in place by engagement of the arms $d$ with the flange $b$ a tight joint will be formed between the branch $a$ or $a'$ and the seat B, the latter being detachable, however, on the exercise of sufficient force.

The seat is applicable to either branch of the valve-casing, so as to provide for making the valve either right handed or left handed.

The ring B may be formed in any desired manner to constitute a seat for the valve, that is to say, it may be a flat ring forming a seat for a washer or it may have a ground seat for receiving a rounded or conical disk valve, and either form of valve may be used.

In Figs. 1 and 2 I have shown a flat ring adapted to serve as the seat for the washer $f$ of a flat valve $f'$, the latter having at the back a ring or yoke $f^2$, which fits upon the valve-spindle D and is retained by means of a screw or pin $f^3$, adapted to a segmental slot in the ring $f^2$, so that the valve can swivel freely on the spindle to an extent permitted by the length of the slot. (See Fig. 5.)

The spindle D shown in Fig. 1 has a bearing at the lower end in the bottom of the valve-casing, and the upper portion of the spindle is provided with a flange or collar $g$, which is adapted to a ground seat formed in the inner face of an annular flange $m$ on a plug or cap F, which is screwed into the threaded opening in the top of the valve-casing.

The plug F has an upwardly-projecting threaded portion for engagement with the threaded portion of a cap G, which bears upon a packing-ring $i$ and presses the same into contact with the flange $m$ and spindle D, this packing, in connection with the ground joint formed by the flange or collar $g$, preventing leakage around the valve-spindle.

Besides serving to retain the spindle D in its proper vertical position in the valve-casing, the flange or collar $g$ also centers the upper portion of the spindle.

The spindle D has, at the outer end, a handle D' of any appropriate character, whereby said spindle may be partially turned, and depending from said handle D' is a finger $n$, the lower end of which plays between a pair of lugs $p$, projecting from the upper portion of the casing A of the valve and separated from each other by a distance equal to the desired throw of the valve in opening and closing the same, say about one-quarter of a complete turn.

The valve is carried by a bent or crooked portion of the spindle D, so that as said spindle is turned in one direction the valve is carried toward and caused to bear upon its seat, so as to prevent the flow of fluid through the valve-casing, while when the spindle D is turned in the opposite direction the valve is carried away from the seat and fluid can freely flow through said valve-casing.

The valve as described has but few parts, is simple in construction, and perfectly tight at all points, the internal stops and guides of the valve shown in the previous patent being entirely dispensed with and external stops being employed in connection with a finger on the valve-handle, so as to serve the double purpose of stops and indicators, the valve being open when the finger is in contact with one of said stops and closed when it is in contact with the other one of the same.

In Fig. 2 I have illustrated my invention as applied to a form of valve having the inlet and outlet at right angles to each other, the inner end of the valve-spindle D in this case having its bearing in a brace-frame or spider I, bridging the inlet-opening of the valve-casing.

In Fig. 3 I have illustrated my invention as applied to a valve having a valve-spindle without end bearing in the casing, but provided with a special means of mounting the valve-spindle so as to permit such end bearing to be dispensed with, the valve-spindle being spirally bent or twisted, and the valve being hung to the inner straight portion of the spindle in the same manner as to the spindle shown in Figs. 1 and 2.

As the spindle has no bearing at the inner end, it must be supported against both inward and outward movements in the plug F. Hence the spindle has a flange or collar $g'$, which is confined between an outer packing-ring $i$ and an inner packing-ring $i'$, the latter being seated upon the internal flange $m$ in said plug F. In this case also the detachable seat B is dispensed with, the rounded valve-disk $s$ seating directly upon the inner end of the outlet branch of the valve, which is ground for the reception of said disk.

It will be observed that the packing-ring $i$ has in the outer end a conical recess for the reception of a mass of soft packing, which is represented by the black shading, both the outer end of the ring $i$ and the mass of soft packing contained in the conical recess of the same being subjected to the pressure of the cap G, so that the soft packing supplements the action of the packing-ring $i$ and effectually prevents any leakage around the valve-spindle.

Having thus described my invention, I claim and desire to secure by Letters Patent—

1. The combination of the valve-casing having an internal valve-seat, the rotatable valve-spindle carrying the valve and having a flange or collar, a hollow plug closing one of the openings in the valve-casing and having a seat for said flange or collar of the valve-spindle, a packing-ring surrounding the valve-spindle and adapted to a recess in the plug, a supplementary packing-ring adapted to a recess in the outer end of said main packing-ring, and a cap applied to the outer portion of the hollow plug and serving to compress said main and supplementary packing-rings, substantially as specified.

2. The combination of the valve-spindle, the valve-disk having at the back a ring or yoke embracing said spindle and having in it a segmental slot and a screw or pin carried by the spindle and passing through said slot, substantially as specified.

In testimony whereof I have signed my name to this specification in the presence of two subscribing witnesses.

JAMES WALSH, JR.

Witnesses:
FRANK E. BECHTOLD,
WILL A. BARR.